(12) United States Patent
Fajardo

(10) Patent No.: US 8,697,974 B1
(45) Date of Patent: Apr. 15, 2014

(54) MUSICAL NOTATION SYSTEM

(71) Applicant: Luis A. Fajardo, San Diego, CA (US)

(72) Inventor: Luis A. Fajardo, San Diego, CA (US)

(*) Notice: Subject to any disclaimer, the term of this patent is extended or adjusted under 35 U.S.C. 154(b) by 0 days.

(21) Appl. No.: 13/904,886

(22) Filed: May 29, 2013

(51) Int. Cl.
  *G09B 15/00* (2006.01)
(52) U.S. Cl.
  USPC .................................................... 84/477 R
(58) Field of Classification Search
  USPC .................................................... 84/477 R
  See application file for complete search history.

(56) References Cited

U.S. PATENT DOCUMENTS

| | | | |
|---|---|---|---|
| 3,698,277 A | 10/1972 | Barra | |
| 3,841,192 A | 10/1974 | Leonard | |
| 5,574,238 A | 11/1996 | Mencher | |
| 6,841,724 B2 | 1/2005 | George | |
| 6,969,793 B2 | 11/2005 | Kerkhoff | |
| 6,987,220 B2 | 1/2006 | Holcombe | |
| 7,148,414 B2 | 12/2006 | Kestenbaum et al. | |
| 7,288,705 B1 * | 10/2007 | Nelson | 84/10 |
| 7,314,991 B2 | 1/2008 | Carlson | |
| 7,674,965 B2 | 3/2010 | Mataele | |
| 7,750,225 B2 | 7/2010 | Rebstock | |
| 7,763,790 B2 | 7/2010 | Robledo | |
| 7,897,862 B2 | 3/2011 | Tashima | |
| 7,982,115 B2 | 7/2011 | Johnston | |
| 2002/0117043 A1 | 8/2002 | Powley | |
| 2008/0141848 A1 | 6/2008 | Weitz | |
| 2008/0295670 A9 | 12/2008 | Egan | |
| 2009/0064848 A1 * | 3/2009 | Henkel | 84/483.2 |
| 2009/0266222 A1 | 10/2009 | Epstein | |
| 2011/0185880 A1 * | 8/2011 | Charles | 84/477 R |

* cited by examiner

*Primary Examiner* — Jianchun Qin
(74) *Attorney, Agent, or Firm* — David A. Belasco; Belasco Jacobs & Townsley, LLP

(57) ABSTRACT

The system of musical notation includes a series of alphabetic characters "C", "D", "E", "F", "G", "A" and "B" representing tones C through B, and a series of alphabetic characters "H", "I", "J", "K" and "L" representing tones C♯ (D♭), D♯ (E♭), F♯ (G♭), G♯ (A♭) and A♯ (B♭), respectively. A timing grid is divided horizontally into an upper register section, a middle register section and a lower register section. The middle register section accommodates tones A, L, B, C, H, D, I and E. The upper register section accommodates tones higher in pitch than E, the lower register section, accommodates tones lower in pitch than A. The grid is divided vertically into horizontal intervals equal to the number of beats per measure. The characters are arranged upon the grid such that the relative timing of the tones is illustrated by their horizontal position with respect to the intervals.

13 Claims, 4 Drawing Sheets

MUSICAL NOTATION SYSTEM

FIELD OF INVENTION

The invention pertains to systems of musical notation. More particularly, the invention relates to systems designed for use in teaching music employing simplified notation relating to half-tones, meter, key, and chord structure. The improved systems provide additional guides to fingering, dynamics, sustaining features and intervals.

BACKGROUND OF THE INVENTION

Various systems have been developed to simplify musical notation in attempts to assist students to translate the notation into musical performance. U.S. Pat. No. 391,887 issued to Fallon incorporates consonants to identify sounds of the notes, dots, and rests, while the vowels designate the life of the consonants, that is, the duration of or value of the sound or note. The 12 chromatic sounds of an octave are represented by the 12 consonants B, D, F, G, Y, L, Ch, N, V, R, S, and T, in the order given. Application of the different alphabetical characters in writing a piece of music is as follows: the respective characters designating the tones of the music and the duration are written on a real or imaginary straight horizontal line from left to right. Consonants or notes receive their duration by writing the respective vowels alongside of the consonant.

U.S. Pat. No. 5,540,132 issued to Hale, is directed to a method and apparatus for teaching musical notation to young children. Each note is associated with a distinctly identifiable color, which is in turn associated with an object that naturally occurs in this color. Each object, in turn, is associated with a cartoon character by color, the first letter of the name and the shape. Each character is endowed with a distinctly identifiable personality characteristic that enables the child to utilize the cartoon character in an educational activity. U.S. Pat. No. 682,015, issued to Adams is a simplified notation for musical tones employing a three line staff for a more compact arrangement and using conventional notes with strike through lines to indicate relative pitch on the abbreviated staff. This system uses conventional note types (full, half, quarter, etc.) to indicate relative timing of tones.

U.S. Pat. No. 4,277,090 issued to Lust uses a composite musical staff of at least two sets of five equally spaced lines each, the two sets of lines forming a composite treble-bass clef staff. Conventional notation is used with this composite staff, designed to simplify orchestral scoring. U.S. Pat. No. 5,574,238 issued to Mencher is a simplified method of musical notation for keyboard instruments designed to enable easier sight-reading and playing of music. Each octave is represented by five lines, each of a different color, to match color tags of the corresponding five black keys of each octave of the keyboard. Each of the lines represents a half-tone and each space on either side of the lines represents a whole tone of an octave on a keyboard.

U.S. Pat. No. 7,982,115 issued to Johnston is directed to a music notation system that utilizes a grid with vertical columns representing musical notes and horizontal rows representing time intervals. This invention is a keyboard-based music notation system that corresponds to the conventional piano keyboard and thus directly related to the disclosure material that you provided. Heavy horizontal lines are used to indicate the beginning and end of bars or measures such as rhythmic groupings while the note symbol may be extended to indicate that that particular note is to be held for more than one time duration period. The shape of the note symbols indicate tone quality or playing style while colors, shading, cross-hatching and graphical texturing are applied to the note symbols in order to specify sound intensity. Connecting lines may be used to indicate groupings of notes.

U.S. Pat. No. 6,987,220 issued to Holcombe is directed to a graphic color music notation for students with distinct colors assigned to the 12 notes within a given octave. The notation system is based on seven spaces for the notes of the C major scale with the remaining notes of the 12 tone scale overlapping these spaces. The notes are shown in different shapes that are proportional to the duration for which they should be played with aides placed above and below the staff to indicate hand and finger movements. Notes that are to be played by the left hand are represented by a different shape than the shape used to represent notes to be played by the right hand. Representation of meter and durations is based on the proportional representation of the start time and relative duration for each note. The actual width of specific values such as a quarter note will vary from piece to piece in order to make the shortest notes clearly visible. Various aides of different shapes are used to indicate hand position and hand movement and are placed above the staff for the right hand and below the staff for the left hand. Numbers within a particular figure indicate the finger to be used while the color indicates the note to be played. Other traditional markings to indicate tempo or dynamics may also be utilized.

U.S. Pat. No. 5,574,238 issued to Mencher is directed to a system for musical notation for keyboard instruments. The system provides for the designation of the octaves by individual sets of lines with a color to match the color of tags of the corresponding keys within the octave on a piano keyboard. The black keys of each octave are tagged in a different color so that the artist may more easily recognize the keys of the piano to be utilized. The music is read from the top of the page to the bottom with notes to be played concurrently marked on the same horizontal line.

U.S. Patent Application No. 2008/0295670 published for Egan is directed to the Morpheus music notation devices and system. Technical and mechanical devices are utilized to simplify music notation to facilitate the learning and teaching of playing various musical instruments. The Morpheus system assigns a number to each key of the piano keyboard. The backbone of the Morpheus system is referred to as the finger ring configuration with each finger of the left hand assigned an alpha character with the right hand designated with distinctive and following alpha characters as well. These in turn correspond to the numeric value of individual piano keys in a classical piano layout.

U.S. Pat. No. 3,841,192 issued to Leonard is directed to a cord transposing and fingering dial. The device comprises a pair of coaxially mounted dials on a panel with one dial being smaller than the other in order to expose a peripheral portion so that proper positioning of one dial versus the other in order to display the notes required to achieve a particularly desired chord. This patent is provided in that your disclosure material indicated a chord finding wheel device that identifies the fingering for all chords and all keys.

While other variations exist, the above-described designs for musical notation systems are typical of those encountered in the prior art. It is an objective of the present invention to provide for a system of musical notation that permits identification of each tone to be played through a single, easily identified character. It is a further objective to provide such identification without reference to positional location of the character, as with conventional musical notation. It is a still further objective of the invention to provide for identification of half-tones through unique, consistent characters. It is yet a further objective to identify the timing and duration of tones through a positioning grid, illustrating the relative relationship of tones to each other without using different symbols (half notes, eight notes, etc.) for the same tone. It is still another objective to differentiate those tones played with the left hand from those played with the right hand through colored or graphical features. It is yet another objective to provide arrows or other markings to indicate notes to be sustained. It is still another objective to use special markings to indicate the end point for sustained notes. It is a further objective to use italic or other special typefaces to indicate arpeggios. It is still a further objective to use colored numbers to indicate timing intervals. It is yet a further objective to provide a simulated piano keyboard along with the musical notation to assist in fingering. It is another objective of the invention to provide keyboard note indicators to be mounted above the keyboard to assist in determining fingering. Finally, it is an objective of the invention to provide a simplified means for determining chord fingering and permitting the musician to explore chord inversions.

While some of the objectives of the present invention are disclosed in the prior art, none of the inventions found include all of the requirements identified.

SUMMARY OF THE INVENTION (1) The improved system of musical notation includes a series of alphabetic characters "C", "D", "E", "F", "G", "A" and "B" representing tones C through B, respectively, and a series of alphabetic characters "H", "I", "J", "K" and "L" representing tones C♯ (D♭), D♯ (E♭), F♯ (G♭), G♯ (A♭) and A♯ (B♭), respectively. A timing grid is provided.

The grid is divided horizontally into an upper register section, a middle register section and a lower register section. The middle register section accommodates characters A, L, B, C, H, D, I and E, with character C representing the middle C tone of a keyboard instrument. The upper register section accommodates characters representing tones higher in pitch than tone E. The lower register section accommodates characters representing tones lower in pitch than tone A.

The grid is divided vertically into horizontal intervals. The number of the intervals is equal to the number of beats per measure of a musical composition. The characters, C through B and H through L, are laid out horizontally upon the grid such that the relative timing of the characters is illustrated by the position of the characters with respect to the intervals. The characters that occur earlier are placed to the left of subsequently occurring characters and are laid out vertically upon the grid such that characters representing tones of higher pitch are placed above those representing tones of lower pitch.

The improvement includes a first color and a second color. The first color is used for the alphabetic characters representing tones to be played with a right hand. The second color is used for the alphabetic characters representing tones to be played with a left hand.

(2) A variation of the invention further divides the grid vertically to indicate a beginning and an end of each measure.

(3) Another variation of the invention further divides the grid vertically to indicate a beginning and an end of each half measure.

(4) An additional variation of the invention further includes a series down arrow markings. The markings are located above those characters between which a tone is to be sustained.

(5) A further variation includes lyrics located above the characters. These lyrics indicate a tone which is to be sustained.

(6) In still another variation a series of "x" markings are located at an end of a melody line. These "x" markings indicate termination of a last tone to be sustained.

(7) An added variation of the invention further includes a series of slash "/" markings. The / markings are located in the horizontal intervals in which a rest is to be sustained.

(8) In a further variation of the invention, a trill is indicated by a lower case alphabetic character "tr" located above those characters employed in the trill.

(9) In yet another variation of the invention, the characters representing tones higher in pitch than the third F above middle C, are indicated by a lower case alphabetic characters "g" through "l" and "k" through "j". The characters are located upon the grid beginning at the same vertical displacement as the characters "G" through "F" representing tones beginning with the second G above middle C. Characters represented by tones higher in pitch than the fourth F above middle C are indicated by underscored lower case alphabetic characters "g" through "c" and "k" through "l". The underscored characters are also located upon the grid beginning at the same vertical displacement as the characters "G" through "F" representing tones beginning with the second G above middle C.

(10) In still another variation of the invention, the characters representing tones lower in pitch than the third A below middle C are indicated by lower case alphabetic characters "g" through "a" and "j" through "l". The characters are located upon the grid beginning at the same vertical displacement as the characters "G" through "A" representing tones beginning with the second G below middle C.

(11) In a further variation, the alphabetic characters are shown in italic type to indicate the tones are to be played rapidly from lowest pitched to highest pitched within a single timing interval with pedal to produce an arpeggio.

(12) In yet a further variation, a simulated keyboard diagram is provided. The diagram labels keys with alphabetic characters C, D, E, F, G, A and B representing tones C through B, respectively.

(13) In still a further variation, portable keyboard character marking devices are provided. The devices are removably located above a piano keyboard and identify whole tones, sharps and flats using both of said series of alphabetic characters.

(14) In a final variation of the invention a chord fingering guide is provided. The guide includes a first wheel. The first wheel includes a left hand diagram labeling a thumb and four fingers of the hand diagram with digits 1-5, respectively. A plurality of note designations and adjacent simulated keyboard diagrams are provided. Each of the diagrams is labeled with the series of alphabetic characters C, D, E, F, G, A and B representing tones C through B, respectively. Each diagram displays white keys and black keys and has a slot adjacent each simulated keyboard diagram. A second wheel is provided. The second wheel is concentrically and rotatably mounted below the first wheel. The second wheel is larger in diameter than the first wheel, is marked with a series of chord names and symbols R, 3, 2 and 1 indicating a root chord, third inversion, second inversion and first inversion. The chord names and symbols are located upon a portion of the second wheel extending outwardly from an outer perimeter of the first wheel.

The second wheel has radially disposed series of the fingering digits. The series of digits is located to align with the slots in the first wheel to indicate fingering for each of the root, third inversion, second inversion and first inversion chords. The first wheel is rotated to align one of the plurality of slots for one of the note designations with one of the symbols to view the fingering digits for any of a selected chord and chord inversion.

Figure 1:
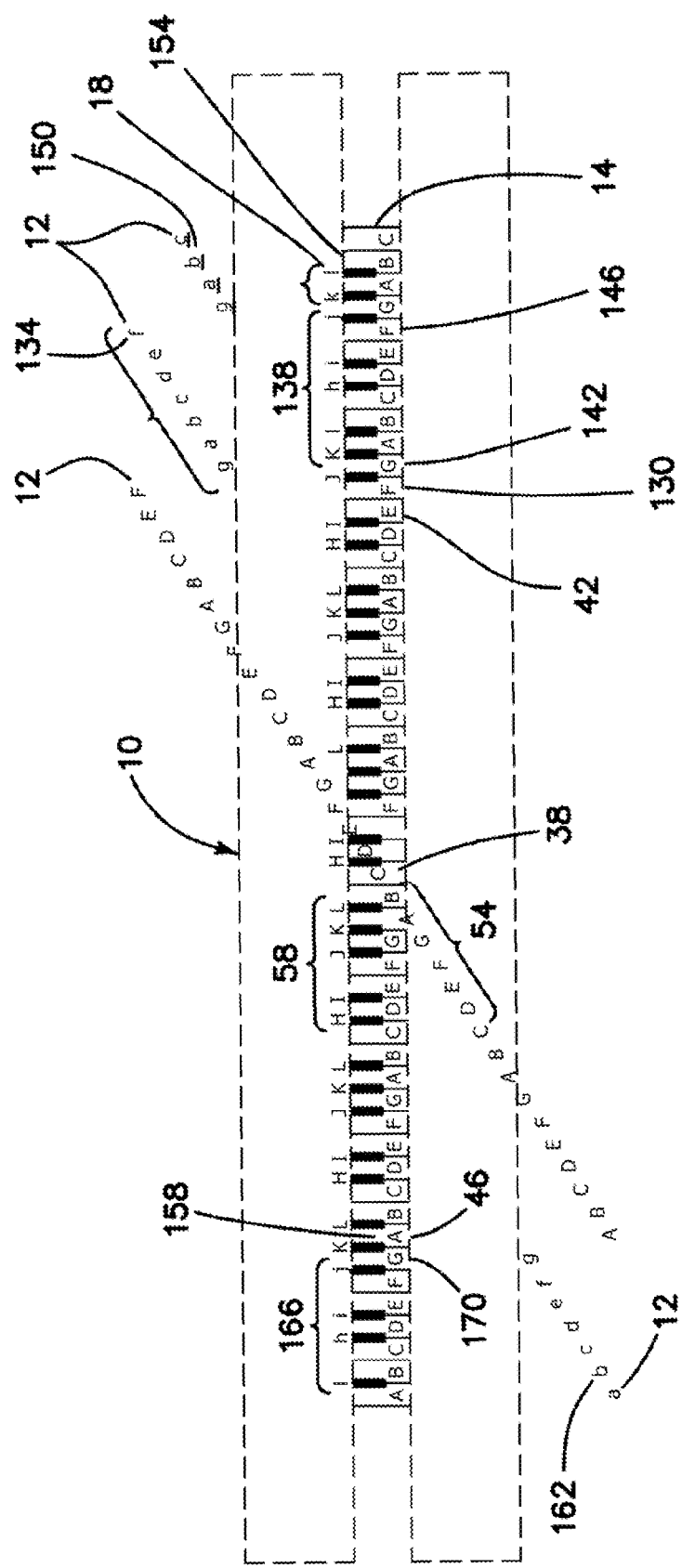
FIG. 1 is a schematic view of the invention's alphabetical characters arranged according to tones on a keyboard instrument.
Figure 2:
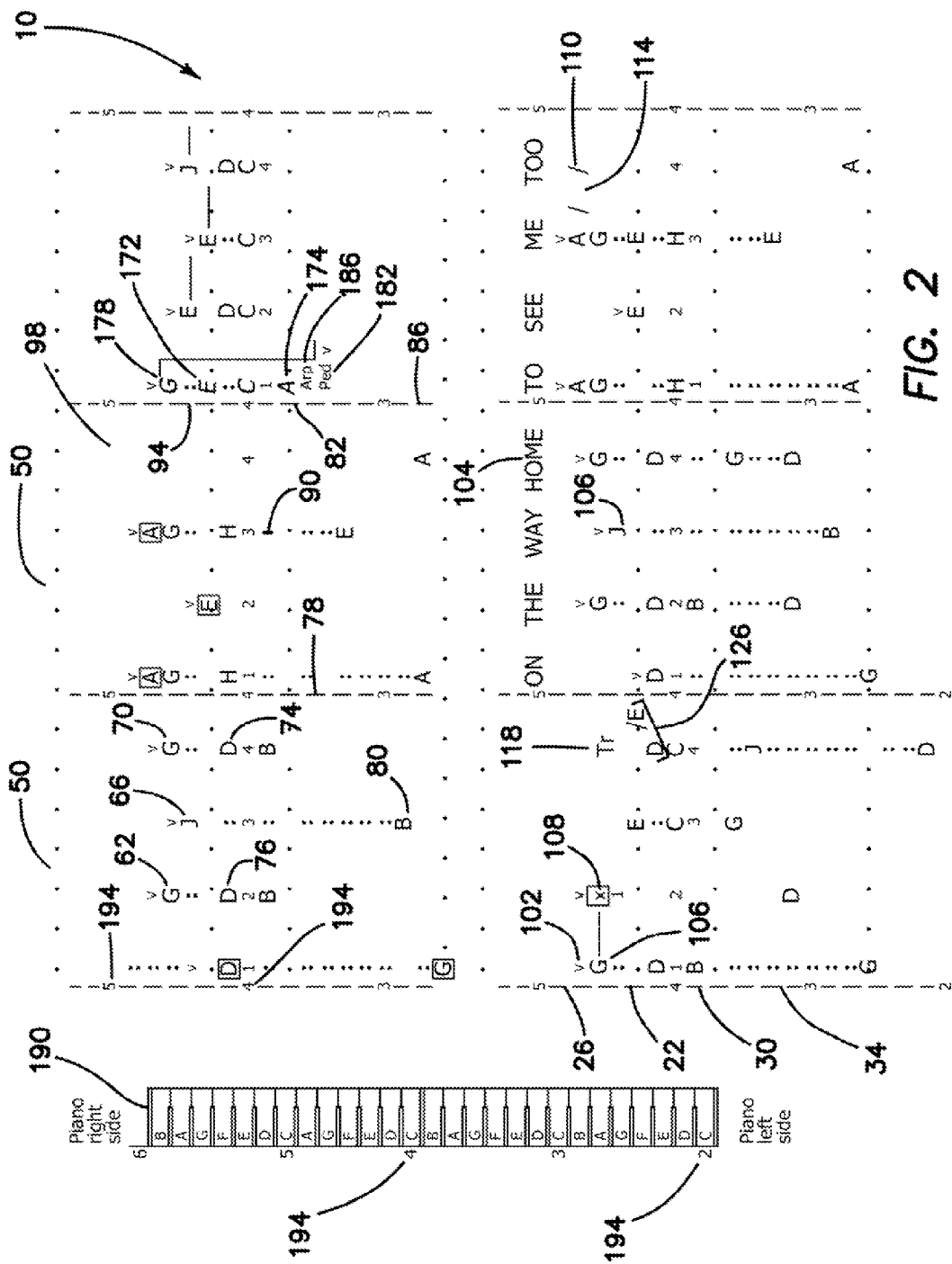
FIG. 2 is a view of the preferred embodiment of the invention with the alphabetical characters arranged on the timing grid in a portion of a sample composition.

DETAILED DESCRIPTION OF THE PREFERRED EMBODIMENT (1) As illustrated in FIGS. 1 and 2, the present invention involves a system of musical notation 10. The improved system of musical notation includes a series of alphabetic characters "C", "D", "E", "F", "G", "A" and "B" representing tones C through B 14, respectively, and a series of alphabetic characters "H", "I", "J", "K" and "L" representing tones C♯ (D♭), D♯ (E♭), F♯ (G♭), G♯ (A♭) and A♯ (B♭) 18, respectively.

As illustrated in FIG. 2, a timing grid 22 is provided. The grid 22 is divided horizontally into an upper register section 26, a middle register section 30 and a lower register section 34. The middle register section 30 accommodates characters A, L, B, C, H, D, I and E, with character C 38 representing the middle C tone of a keyboard instrument. The upper register section 26 accommodates characters representing tones higher in pitch than tone E 42. The lower register section 34 accommodates characters representing tones lower in pitch than tone A 46.

The grid 22 is divided vertically into horizontal intervals 50. The number of the intervals 50 is equal to the number of beats per measure of a musical composition. The characters C through B 54 and H through L 58, are laid out horizontally upon the grid 22 such that the relative timing of the characters is illustrated by the position of the characters with respect to the intervals 50. The characters which occur earlier 62 are placed to the left of subsequently occurring characters 66 and are laid out vertically upon the grid such that characters representing tones of higher pitch 70 are placed above those representing tones of lower pitch 74.

The improvement includes a first color 76 and a second color 80. The first color 76 is used for the alphabetic characters representing tones to be played with a right hand (not shown). The second color 80 is used for the alphabetic characters representing tones to be played with a left hand (not shown).

(2) A variation of the invention further divides the grid vertically to indicate a beginning 78 and an end 82 of each measure 86.

(3) Another variation of the invention further divides the grid vertically to indicate a beginning 90 and an end 94 of each half measure 98.

(4) An additional variation of the invention further includes a series of down arrow markings 102. The markings 102 are located above those characters 106 between which a tone is to be sustained.

(5) A further variation includes lyrics 104 located above the characters 106. These lyrics 104 indicate a tone which is to be sustained.

(6) In still another variation a series of "x" markings 108 are located at an end of a melody line. These "x" markings 108 indicate termination of a last tone to be sustained.

(7) An added variation of the invention further includes a series of slash "/" markings 110. The / markings 110 are located in the horizontal intervals 114 in which a rest is to be sustained.

(8) In a further variation of the invention, a trill 118 is indicated by lower case alphabetic characters "tr" 122 located above those characters 126 employed in the trill.

(9) In yet another variation of the invention, as illustrated in FIG. 1, the characters representing tones higher in pitch than the third F above middle C 130, are indicated by lower case alphabetic characters "g" through "f" 134 and "k" through "j" 138. The characters 134 and 138 are located upon the grid 22 beginning at the same vertical displacement as the characters "G" through "F" representing tones beginning with the second G above middle C 142. Characters represented by tones higher in pitch than the fourth F above middle C 146 are indicated by underscored lower case alphabetic characters "g" through "c" 150 and "k" through "l" 154. The underscored characters 150 and 154 are also located upon the grid 22 beginning at the same vertical displacement as the characters "G" through "F" representing tones beginning with the second G above middle C 142.

(10) In still another variation of the invention, the characters representing tones lower in pitch than the third A below middle C 158 are indicated by lower case alphabetic characters "g" through "a" 162 and "j" through "l" 166. The characters 162 and 166 are located upon the grid 22 beginning at the same vertical displacement as the characters "G" through "A" representing tones beginning with the second G below middle C 170.

(11) In a further variation, as illustrated in FIG. 2, the alphabetic characters are shown in italic type 172 to indicate the tones are to be played rapidly from lowest pitched 174 to highest pitched 178 within a single timing interval 50 with pedal 182 to produce an arpeggio 186.

Figure 3:
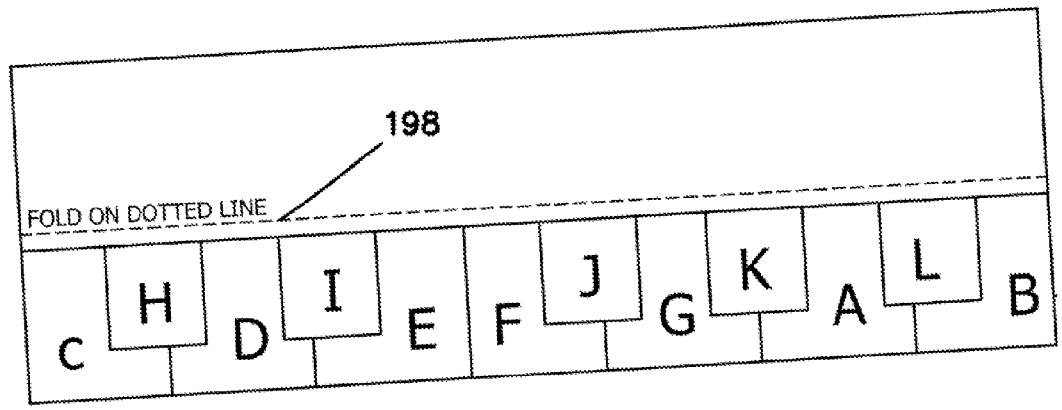
FIG. 3 is a perspective view of portable keyboard character marking devices for use with a piano keyboard.
Figure 3:
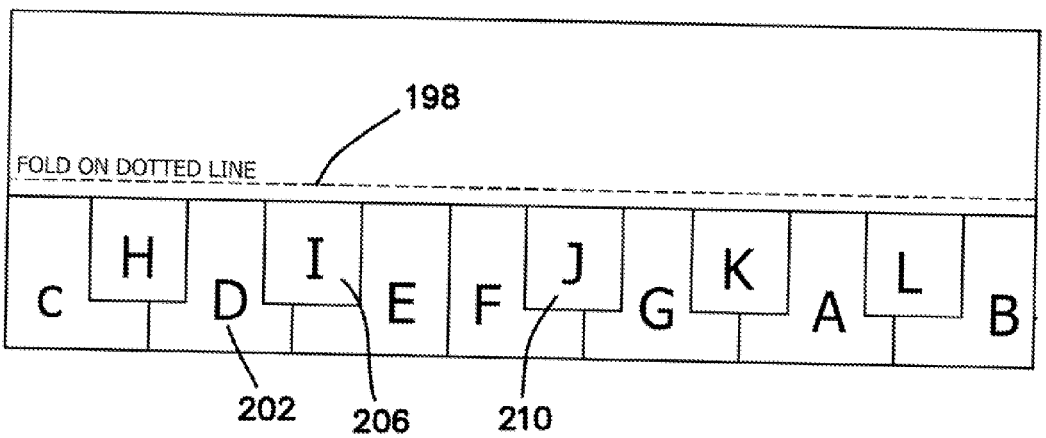
Figure 3:
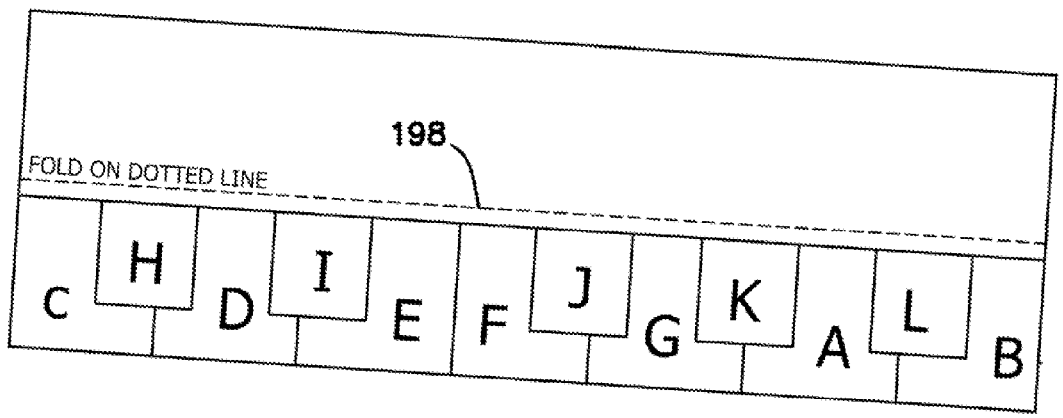

(12) In yet a further variation, as illustrated in FIG. 3, a simulated keyboard diagram 190 is provided. The diagram 190 labels keys with alphabetic characters C, D, E, F, G, A and B representing tones C through B, respectively and indicates octaves markings 194 corresponding to octave markings 194 on the grid 22.

Figure 4:
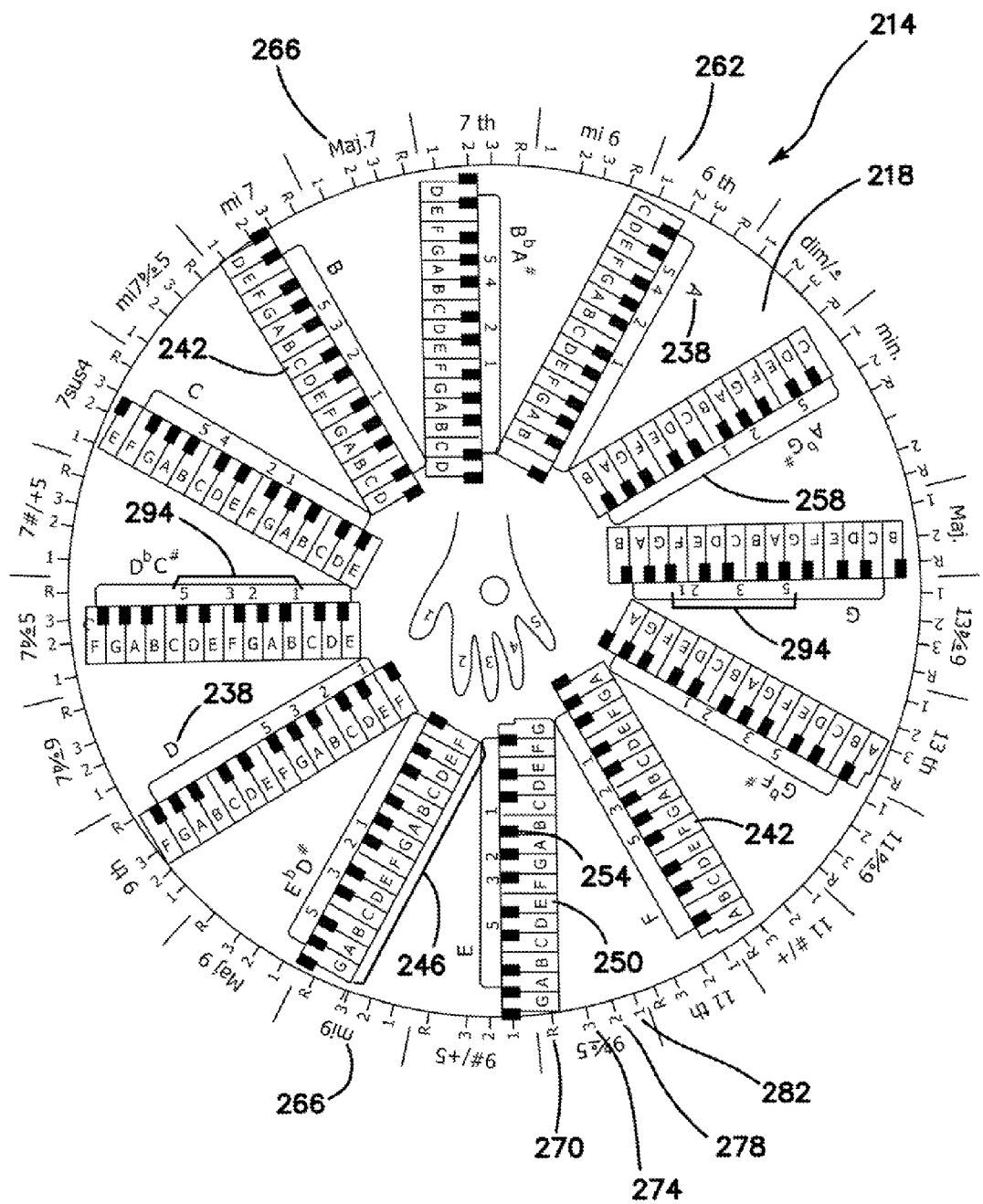
FIG. 4 is a planar view of a chord fingering guide.

(13) In still a further variation, as illustrated in FIG. 4, portable keyboard character marking devices 198 are provided. The devices 198 are removably located above a piano keyboard (not shown) and identify whole tones 202, sharps 206 and flats 210 using both of said series of alphabetic characters 14, 18.

(14) In a final variation of the invention a chord fingering guide 214 is provided. The guide 214 includes a first wheel 218. The first wheel 218 includes a left hand diagram 222 labeling a thumb 226 and four fingers 230 of the hand diagram 222 with digits 1-5 234, respectively. A plurality of note designations 238 and adjacent simulated keyboard diagrams 242 are provided. Each of the diagrams 242 is labeled with the series of alphabetic characters C, D, E, F, G, A and B 246 representing tones C through B, respectively. Each diagram 242 displays white keys 250 and black keys 254 and has a slot 258 adjacent each simulated keyboard diagram 242.

A second wheel 262 is provided. The second wheel 262 is concentrically and rotatably mounted below the first wheel 218. The second wheel 262 is larger in diameter than the first wheel 218, is marked with a series of chord names 266 and symbols R 270, 3 274, 2 278 and 1 282 indicating a root chord, third inversion, second inversion and first inversion. The chord names 266 and symbols 270, 274, 278 and 282 are located upon a portion 286 of the second wheel 262 extending outwardly from an outer perimeter 290 of the first wheel 218.

The second wheel 262 has radially disposed series of the fingering digits 294. The series of digits 294 is located to align with the slots 258 in the first wheel 218 to indicate fingering for each of the root 270, third inversion 274, second inversion 278 and first inversion 282 chords. The first wheel 218 is rotated to align one of the plurality of slots 258 for one of the note designations 238 with one of the symbols 270, 274, 278 and 282 to view the fingering digits 294 for any of a selected chord and chord inversion 270, 274, 278 and 282.

The system of musical notation 10 has been described with reference to particular embodiments. Other modifications and enhancements can be made without departing from the spirit and scope of the claims that follow.

The invention claimed is:

1. An improved system of musical notation, wherein said system comprises:
    a series of alphabetic characters C, D, E, F, G, A and B representing tones C through B, respectively;
    a series of alphabetic characters H, I, J, K and L representing tones C♯ (D♭), D♯ (E♭), F♯ (G♭), G♯ (A♭) and A♯ (B♭), respectively;
    a timing grid, said grid being divided horizontally into an upper register section, a middle register section and a lower register section;
    said middle register section accommodating characters A, L, B, C, H, D, I and E, said character C representing the middle C tone of a keyboard instrument;
    said upper register section accommodating characters representing tones higher in pitch than tone E;
    said lower register section accommodating characters representing tones lower in pitch than tone A;
    said grid being divided vertically into horizontal intervals, the number of said intervals being equal to the number of beats per measure of a musical composition;
    said characters, C through B and H through L, being disposed horizontally upon said grid such that the relative timing of the characters is illustrated by the position of the characters with respect to the intervals with characters occurring earlier placed to the left of subsequently occurring characters and being disposed vertically upon said grid such that characters representing tones of higher pitch are placed above those representing tones of lower pitch;
    said improvement comprising:
        a first color, said first color being used for said alphabetic characters representing tones to be played with a right hand;
        a second color, said second color being used for said alphabetic characters representing tones to be played with a left hand;
        a chord fingering guide, said guide comprising:
            a first wheel, said first wheel comprising a left hand diagram labeling a thumb and four fingers of said hand diagram with digits 1-5, respectively, a plurality of note designations and adjacent simulated keyboard diagrams, each of said diagrams labeled with said series of alphabetic characters C, D, E, F, G, A and B representing tones C through B, respectively, displaying white keys and black keys and having a slot adjacent each simulated keyboard diagram;
            a second wheel, said second wheel being concentrically and rotatably mounted below said first wheel, being of larger in diameter than said first wheel, being marked with a series of chord names and symbols R, 1, 2 and 3 indicating a root chord, first inversion, second inversion and third inversion, said chord names and symbols being disposed upon a portion of said second wheel extending outwardly from an outer perimeter of said first wheel;
            said second wheel having radially disposed series of said fingering digits, said series of digits disposed to align with said slots in said first wheel to indicate fingering for each of said root, first inversion, second inversion and third inversion chords; and
            wherein said first wheel is rotated to align one of said plurality of slots for one of said note designations with one of said symbols to view said fingering digits for any of a selected chord and chord inversion.

2. The improved system of musical notation as described in claim 1, wherein said grid is further divided vertically to indicate a beginning and an end of each measure.

3. The improved system of musical notation as described in claim 1, wherein said grid is further divided vertically to indicate a beginning and an end of each half measure.

4. The improved system of musical notation as described in claim 1, further comprising a series of down arrow markings, said markings being disposed above those characters between which a tone is to be sustained.

5. The improved system of musical notation as described in claim 4, further comprising a series of "x" markings, said markings being disposed at an end of a melody line and indicating termination of a last tone sustained.

6. The improved system of musical notation as described in claim 1, wherein lyrics disposed above said characters indicate a tone which is to be sustained.

7. The improved system of musical notation as described in claim 1, further comprising a series of slash/markings, said/markings being disposed in those horizontal intervals in which a rest is to be sustained.

8. The improved system of musical notation as described in claim 1 wherein a trill is indicated by lower case alphabetic characters tr disposed above those characters employed in the trill.

9. The improved system of musical notation as described in claim 1, wherein characters representing tones higher in pitch than the third F above middle C are indicated by lower case alphabetic characters g through f and k through j, said characters being disposed upon the grid beginning at the same vertical displacement as the characters G through F representing tones beginning with the second G above middle C and characters represented by tones higher in pitch than the fourth F above middle C are indicated by underscored lower case alphabetic characters g through c and k through l, said underscored characters also being disposed upon the grid beginning at the same vertical displacement as the characters G through F representing tones beginning with the second G above middle C.

10. The improved system of musical notation as described in claim 1, wherein characters representing tones lower in pitch than the third A below middle C are indicated by bold lower case alphabetic characters g through a and j through l, said characters being disposed upon the grid beginning at the same vertical displacement as the characters G through A representing tones beginning with the second G below middle C.

11. The improved system of musical notation as described in claim 1 wherein said alphabetic characters are shown in italic type to indicate said tones are to be played rapidly from lowest pitched to highest pitched within a single timing interval with pedal to produce an arpeggio.

12. The improved system of musical notation as described in claim 1, further comprising a simulated keyboard diagram, said diagram labeling keys with alphabetic characters C, D, E, F, G, A and B representing tones C through B, respectively.

13. The improved system of musical notation as described in claim 1, further comprising portable keyboard character marking devices, said devices being removably disposed above a piano keyboard and identifying whole tones, sharps and flats using both of said series of alphabetic characters.

* * * * *